UNITED STATES PATENT OFFICE.

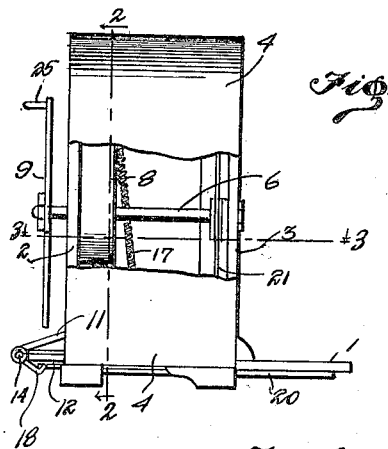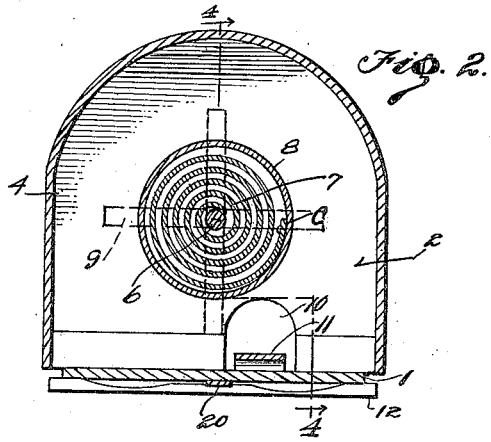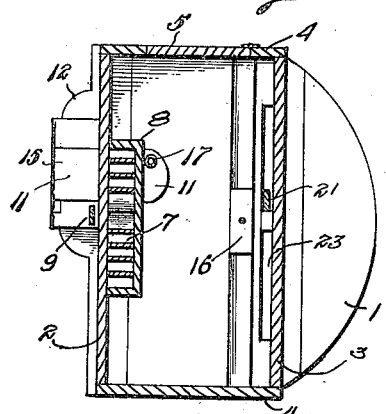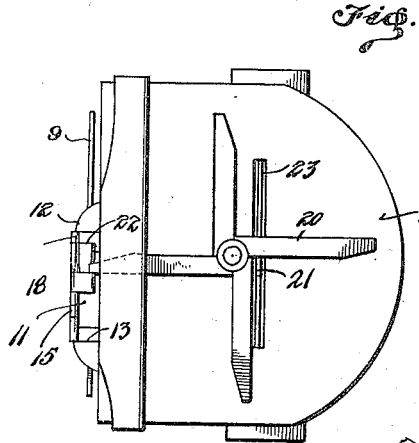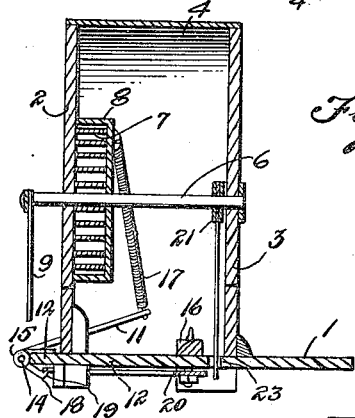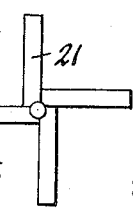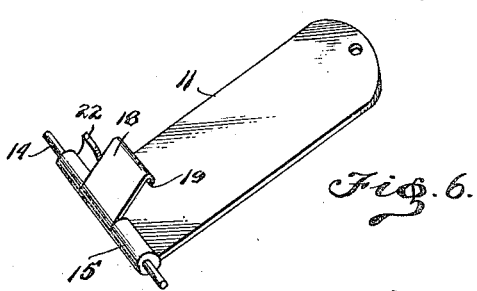

CLIFTON C. ROCKWELL, OF TUCSON, ARIZONA.

ANIMAL TRAP.

1,423,261.   Specification of Letters Patent.   Patented July 18, 1922.

Application filed January 3, 1918, Serial No. 210,172. Renewed December 11, 1920. Serial No. 430,044.

*To all whom it may concern:*

Be it known that I, CLIFTON C. ROCKWELL, a citizen of the United States, residing at Tucson, in the county of Pima, State of Arizona, have invented certain new and useful Improvements in Animal Traps; and I do hereby declare the following to be a full, clear, and exact description of the invention, such as will enable others skilled in the art to which it appertains to make and use the same.

This invention relates to animal traps.

The object of the invention is to provide a trap which will deliver a blow to throw the animals away from the trap, the blow at the same time possessing sufficient force to kill the animal. The blow delivering mechanism is operated by a motor device which may be wound so that sufficient power to deliver a number of blows is stored up, and an automatic release device is interposed after each blow to check the blow delivering mechanism until the succeeding release.

The trap constructed according to this invention possesses the advantage that it is kept clear of animals, since they are thrown away from the trap and furthermore the animals are killed without injuring the skins. The latter advantage is of value where the trap is used for trapping fur bearing animals.

With the above objects in view, and such others relating to the details of construction, as may hereinafter appear, my invention will now be fully set forth and described, reference being had to the accompanying drawings.

In the drawings:—

Figure 1 is a side elevation of the present trap, the cover structure being broken away to disclose a part of the interior.

Figure 2 is a section on line 2—2 of Fig. 1.

Figure 3 is a section on line 3—3 of Fig. 1.

Figure 4 is a section on line 4—4 of Fig. 2

Figure 5 is a bottom plan.

Figure 6 is a perspective view of the tilting platform looking toward the under side thereof.

Figure 7 is a detail elevation of the gear member.

Figure 8 is a detail perspective view of the tongue and its stop illustrating one of the arms of the latch member engaged therewith.

Referring more particularly to the drawings, 1 represents a base plate upon which are mounted the opposing parallel vertical walls 2 and 3. The edges of the walls 2 and 3 are joined by means of a cover structure 4 which completes a housing for part of the trap mechanism, a closure 5 hinged to an opening in the cover element 4 giving access to the housing when necessary. Journaled in the walls 2 and 3 is a shaft 6 to which one end of a coil spring 7 is secured, the opposite end of the spring being connected to a spring housing 8 secured to the inner face of the wall 2. The shaft 6 extends beyond the wall 2, and upon its outer end has fixedly mounted thereupon a multi-armed striker 9. The striker 9 is preferably formed with four right angular directed arms, it having been found that the ninety degree spacing is probably the most efficient for permitting the striker to gain a proper momentum before delivering a blow against the side of an animal which is adapted to take the bait.

Below the shaft 6, and slightly to one side of the latter, on a level with the base 1, the wall 2 has formed therethrough an aperture 10, through which a hinged platform 11 extends. The platform 11 is hinged to the margin of a ledge 12, a recess 13 cut into the ledge having a spindle 14 extended thereacross around which the tubular hinge element 15 of the platform 11 is mounted. The platform 11 extends for a sufficient distance through the aperture 10 and into the housing to locate a bait receptacle 16 well within the housing so that an animal attempting to take the bait will be caused to walk along the length of the platform through the opening 10. The inner or free end of the platform 11 is held in an upraised position by means of a light coil spring 17 one end of which is secured to the extremity of the platform while the other is fixed in the side of the wall 2 or the spring housing 8. Below the lower side of the platform 11 and forming a part of the hinge portion 15 is a tongue 18. The free end of the tongue 18 is upturned at right angles to the latter and beveled so that one end provides a stop 19. Said stop 19 is adapted to be contacted in succession by the arms of a four-armed rotary latch member 20 which is pivoted against the lower face of the base 1. The arms of the latch device 20 correspond in number to the arms of the striker 9, and also correspond in number to the arms of a gear member 21 which is fixed upon the shaft 6 against the wall 3. As stated, the stop member 19 is adapted to be contacted by means of the ends of the arms of the latch member 20, but this locking engagement occurs in one direction only, the beveled edge of the stop 19 permitting the arms of the latch member to ride past by pressing the lock in the reversed direction. As a means for assisting the action of the spring 17 a cam lift 22 is formed as an extension of the platform 11 and is adapted to be thrown upwardly by the initial contact of the extremity of the approaching arm of the latch member 20 immediately after the platform has been depressed to release the arm engaged by the stop flange 19. This cam lift provides against the release of two successive arms upon a single depression of the platform.

The arms of the gear member 21 operate in a slot 23 in the base 1, so that they may stand successively behind the arms of the latch member 20 in position to shove the latter around when it is released by the depression of the platform, the rotation of the gear member 21 being effected of course by the power from the spring motor. Obviously, the motion is also communicated to the striker, which is thrown through an arc of ninety degrees to carry one of the arms thereof across the platform 11 so as to strike the animal which has walked thereon to take the bait. The succeeding arm of the gear member 21 engages behind the succeeding arm of the latch member, since the latter is stopped by its contact with the repositioning stop flange 19, the parts standing in position to be released by the next animal.

Fig. 1 shows the bait trigger 11 in place. It acts as an automatic stop and is released by an animal stepping on the trigger 11 to get the bait (as in Fig. 6) thus pressing the trigger 11 downward and at the same time releasing the cross arm member 20 (Fig. 5) which in turn releases the cross arm member 21 (Fig. 3) thus leaving the spring motor 8 (Fig. 4) free to rotate the striking arm 9 (Fig. 1) to kill the animal and to throw it clear of the trap at the same time the trap sets itself for the next animal.

The mechanism which has been described, is capable of being manufactured in various sizes for trapping mice or rats, or for use in trapping wild or fur bearing animals, and furthermore, the mechanism may be embodied in casings or housings of any suitable type it only being necessary that the striker and the releasing or bait platform be mounted in accessible relation to the animals. For the purpose of winding the spring, a handle 25 may be mounted upon one of the arms of the striker though this is not a necessary adjunct, it being possible to wind the device merely by grasping the arms of the striker and rotating the latter.

The device is a very simple mechanism for killing animals by a blow or shock in such a manner that their skins or furs are not disturbed, the parts being so arranged that the arms of the striker will come into contact with the body of the animal just at or behind the shoulder where the blow will not only impart an effective shock, but will also lift the animal to throw it away from the trap.

What I claim as my invention is:—

1. An animal trap of the character described comprising a base, a housing rising from the base and having an entrance opening, an armed striking member rotatably supported by the housing in position for movement of its arms across the entrance opening, a motor within the housing, connections between the motor and the striking member for rotation of the latter, a rotatable latch member mounted beneath the base and including arms equal in number to the arms of the striking member, a gear member connected with the striking member for rotation therewith and arranged to engage the latch member for rotation thereof, a depressible platform pivoted to the base and extending through the entrance opening, yieldable means for holding the platform normally against depression and a stop connected with the platform for movement therewith to lie in the path of movement of the arms of the latch member when the platform is in normal position and to lie out of the said path of movement when the platform is depressed.

2. An animal trap of the character described comprising a base, a housing rising from the base and having an entrance opening therein, a shaft journaled in the housing, an armed striking member carried by the shaft and arranged for movement of its arms across the entrance opening when the shaft is rotated, a motor within the housing and connected with the shaft for rotation thereof, an armed gear member carried by the shaft and arranged for movement of the extremities of its arms below the base when the shaft is rotated, an armed latch member rotatably mounted beneath the base and disposed in position for engagement of its arms successively by the arms of the gear member for rotation of the latch member, a depressible platform connected with the base and extending through the entrance opening, yieldable means for holding the platform normally against depression, a stop carried by the platform and movable therewith to lie in the path of movement of the arms of the latch member when the platform is in normal position and to lie out of the said path of movement when the platform is depressed and a cam member connected with the platform for movement therewith to lie in position to be engaged by the arms of the latch member when the platform is depressed and to lie out of said position when the platform is in normal position, said cam member having its cam face so disposed that engagement of the latch member arms therewith will elevate the cam member and the platform therewith to bring the stop into the path of movement of the latch member arms.

In testimony whereof, I affix my signature in the presence of two witnesses.

CLIFTON C. ROCKWELL.

Witnesses:
B. JANNEY,
CELESTINE A. PHILLIPS.